March 31, 1953  J. I. MITCHELL  2,633,401
INDICATING AND RECORDING NAVIGATIONAL INSTRUMENT
Filed March 6, 1947  4 Sheets-Sheet 1

INVENTOR
JAMES I. MITCHELL
BY
ATTORNEY

March 31, 1953　　　J. I. MITCHELL　　　2,633,401
INDICATING AND RECORDING NAVIGATIONAL INSTRUMENT
Filed March 6, 1947　　　　　　　　　　　4 Sheets—Sheet 2

INVENTOR
JAMES I. MITCHELL
BY
ATTORNEY

March 31, 1953  J. I. MITCHELL  2,633,401
INDICATING AND RECORDING NAVIGATIONAL INSTRUMENT
Filed March 6, 1947  4 Sheets-Sheet 3
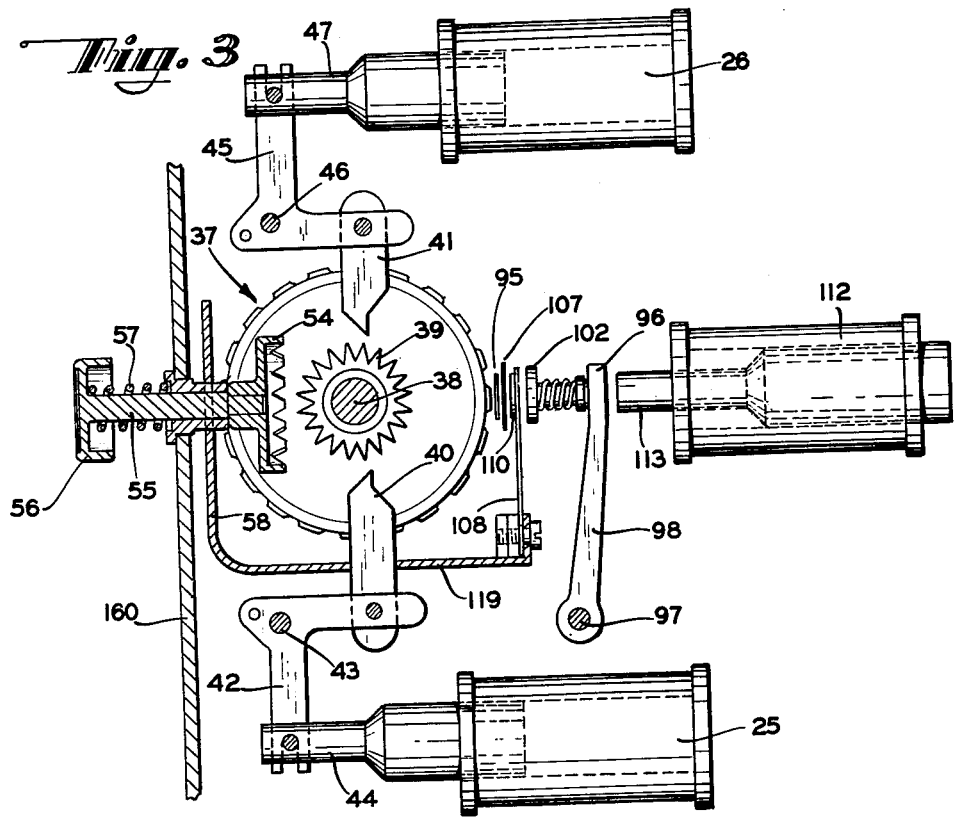
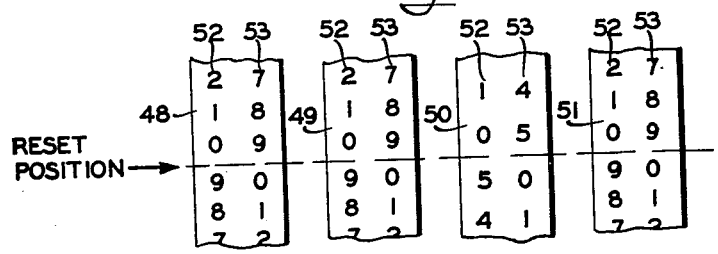
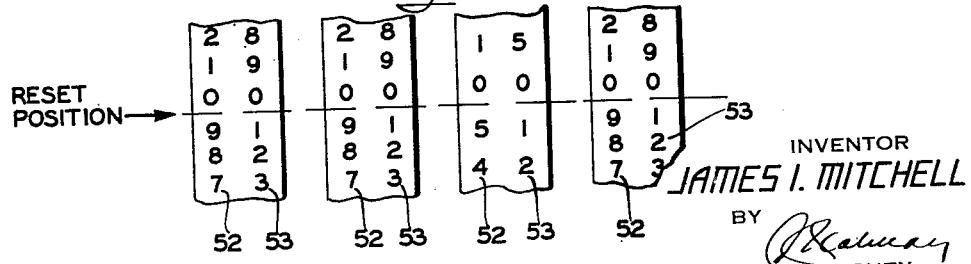
INVENTOR
JAMES I. MITCHELL
BY
ATTORNEY

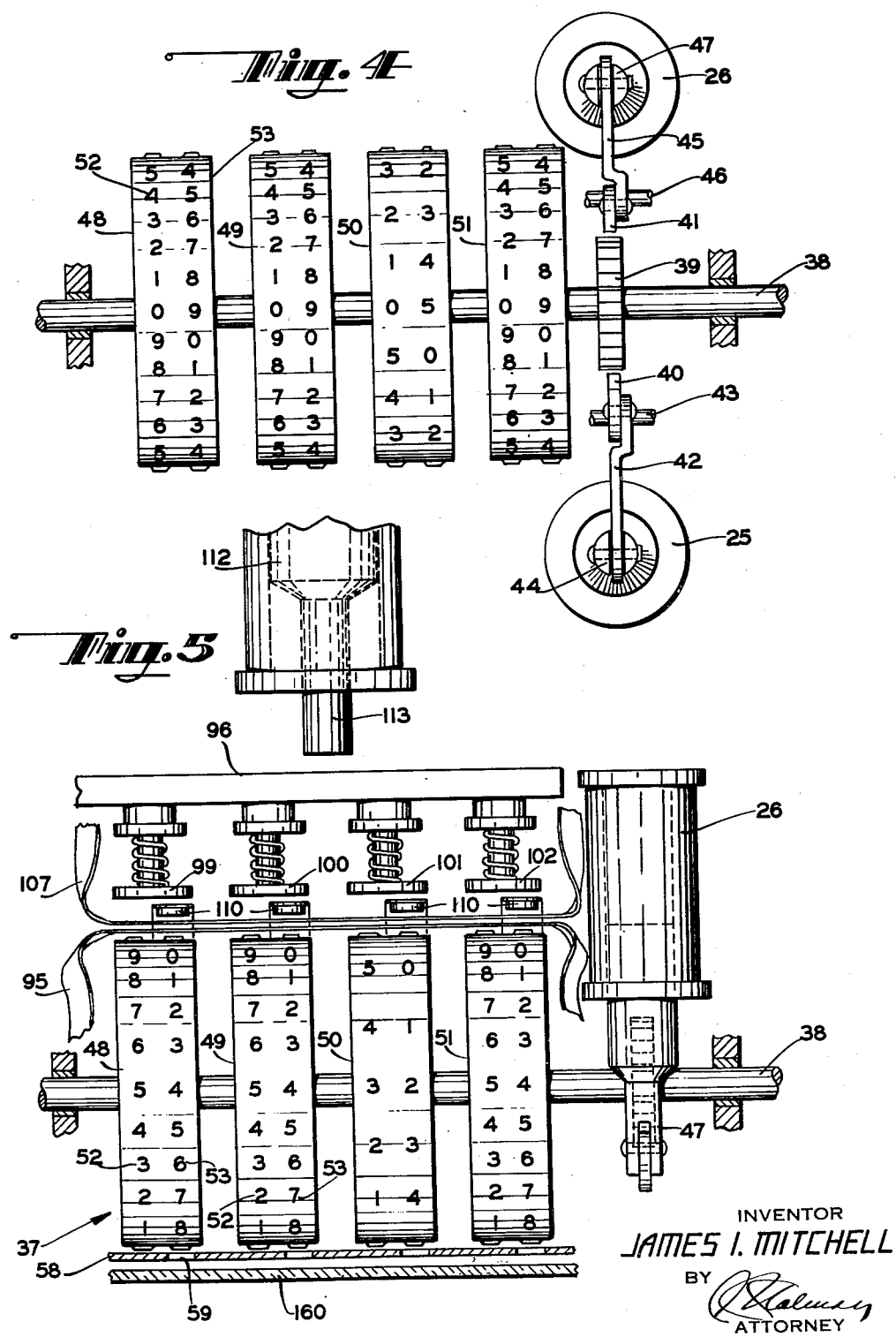

Patented Mar. 31, 1953

2,633,401

UNITED STATES PATENT OFFICE 2,633,401

INDICATING AND RECORDING NAVIGATIONAL INSTRUMENT

James I. Mitchell, River Edge, N. J., assignor to Bendix Aviation Corporation, Teterboro, N. J., a corporation of Delaware Application March 6, 1947, Serial No. 732,844

4 Claims. (Cl. 346—14)

1

This invention relates to navigational apparatus for mobile craft, and more particularly to apparatus which will provide at one location an indication of certain navigational data such as, for example, latitude, longitude and distance traversed and also will supply at another and remote location a visual indication and permanent record of some or all of the above-mentioned data together with the time for any point in its course of movement.

In the operation of mobile craft, such as aircraft, for example, it is desirous to obtain a permanent record of the course travelled by the craft from its point of departure to its destination. The general manner heretofore followed for securing the desired record has been to manually transcribe the visual indications or readings given by the various instruments onto the permanent record or log. The possibility of error, arising when such a manual transcription is made, is not remote due to the existence of many factors which result in error attributable to the human element. This source of error may be removed by the elimination of the human element if the permanent record is made by the instruments which provide the visual indication.

In the case of the present and future high-speed aircraft, it is essential to have a permanent record of the course traversed in its flight. To have the pilot transcribe the visual indication of his instrument would divert his attention from other duties that are more necessary and essential. A device which will automatically perform the necessary function and thus permit the pilot to devote his complete attention to the performance of other functions necessary for the proper and safe operation of his craft is highly desirable.

It is an object of the present invention, therefore, to provide a novel navigational instrument whereby desired navigational data may be reproduced at one or more spaced points.

Another object is to provide a novel navigational aid wherein, in addition to indicating desirable flight data, such data may be automatically recorded on to a permanent log.

A further object of the invention is to provide novel apparatus to be used in conjunction with an air position computer and a clock which will take the signal from the computer and clock and provide a visual indication of the position of the craft during its course of flight with reference to time as well as a permanent record thereof at a location where it is easily available to the pilot or at some station remote from the pilot.

2

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only, and are not to be construed as defining the limits of the invention, reference being had for this purpose to the appended claims.

In the drawings, wherein like reference numerals refer to like parts:

Figure 3 is a sectional view taken substantially along line 3—3 of Figure 2;

Figure 4 is a front elevation view of the counter wheels of the apparatus of Figure 1;

Figure 5 is a top elevation of the counter wheels of Figure 4 together with the printing mechanism associated therewith; and, Figures 6 and 7 are partial developments of the counter wheels illustrating the relation of the numerals thereon.

The present invention contemplates the utilization of a conventional position indicator of the character shown in Avery U. S. Patent No. 1,963,457, issued June 19, 1934, for example, wherein latitude and longitude counters are operated to visually indicate craft position in terms of latitude and longitude. Generally considered such counters are modified to produce longitude and latitude signals and a clock is provided to produce a desired time signal. These signals are electrically transmitted by means of a contactor arrangement to a remote indicator and recorder whereby stepping solenoids are energized which actuate the indicating counter mechanisms for latitude, longitude and time respectively to provide the visual indication, in a manner to be described more fully hereinafter. The permanent record is secured by energizing a solenoid by means of a push button whereby a tape and inked ribbon is pressed against the counter wheels to secure an inked impression of the visual indication upon the tape.

Figure 2:
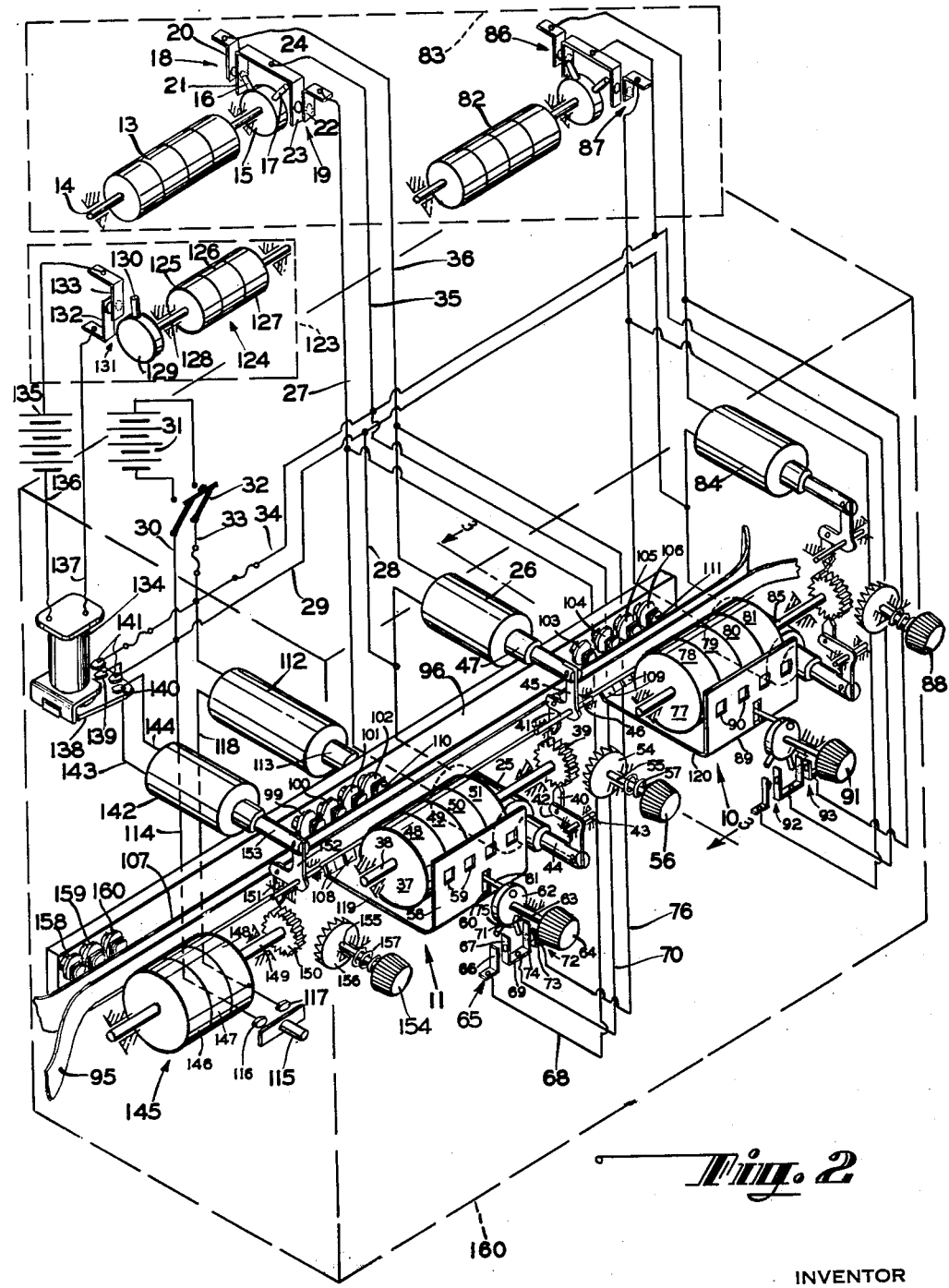
Figure 2 is a diagrammatic representation of the novel apparatus of Figure 1.

Referring now to the drawings for a more detailed description of the present invention, the longitude and latitude indicators and recorders, generally designated with the reference characters 10 and 11 in Figure 2, are identical in operation and structure so that but one unit need be described in detail, such description applying equally as well to the other unit. To this end latitude unit 11 may be taken as an example.

Signals for actuating latitude unit 11 are transmitted by means of a contactor arrangement at a latitude indicating counter 13 of a computer unit (not shown). The counter is mounted for rotation by a shaft 14 which at one end is driven by a suitable gear arrangement (not shown) in proportion to craft change of latitude and at its other end carries a wheel 15 having two insulating pins 16 and 17 at its outer periphery which are located in spaced parallel planes.

Pins 16 and 17 are adapted for operating related switches 18 and 19, switch 18 comprising a fixed contact 20 and a movable contact 21 and switch 19 comprising a fixed contact 22 and a movable contact 23, both of the movable contacts being joined by a bridge element 24. By virtue of this arrangement, with a clockwise rotation of counter 13, when viewed from end of shaft carrying wheel 15 pin 16 engages contact 21 to close and open switch 18 for each minute travelled in a S. to N. direction while in response to a counterclockwise rotation of counter 13, pin 17 engages contact 23 to close and open switch 19 for each minute travelled in a reverse or N. to S. direction. Inasmuch as pins 16 and 17 are located in spaced parallel planes, each pin will engage only its related switch notwithstanding the direction of rotation of the counter. It is to be noted, however, that in response to counterclockwise rotation, for example, pin 16 will engage movable contact 21 momentarily to deflect it away from the fixed contact 20 and after it has passed the movable contact 21 the latter will spring to its normal position without engaging the fixed contact 20.

The above described operation of switches 18 and 19 will energize a solenoid 25 located in the latitude indicator and recorder unit 11 when the direction of craft movement is from north to south (manifested by counterclockwise rotation of counter 13) or a solenoid 26 when the direction of craft movement is reversed, i. e., south to north (manifested by a clockwise rotation of counter 13).

One side of solenoid 25 is connected by way of a lead 27 with fixed contact 22 of switch 19 and the other side thereof is connected by leads 28, 29 and 30 with one side of a battery 31, assuming a switch 32 to be closed, the opposite side of the battery being connected to bridge element 24 by way of leads 33, 34 and 35. Thus for each closure of switch 19 by pin 17, solenoid 25 is energized from battery 31.

Solenoid 26 on the other hand is connected on one side by way of a lead 36 with fixed contact 20 of switch 18 and at its opposite side with battery 31 by way of leads 28, 29 and 30. Thus upon closure of switch 18 by means of pin 16, solenoid 26 is energized by battery 31.

Latitude unit 11 includes a latitude counter 37 which is identical with counter 13 and is rotatably supported by a suitably journalled shaft 38, the latter being provided with a ratchet wheel 39 thereon adapted for operation by either of two pawls 40 and 41. Pawl 40, for example, is rigidly fastened to one end of a lever 42, pivotally mounted by a pin 43, the opposite end of the lever 42 being fastened to a movable plunger 44 of solenoid 25 (Figure 3) while pawl 41 is fastened to one end of a lever 45, pivotally supported by a pin 46, the opposite end of the lever 45 being connected to a movable plunger 47 of solenoid 26.

Assuming that the direction of craft movement is from north to south, switch 19 will be closed by pin 17, once for each minute travelled, to energize solenoid 25 whereupon pawl 40 is moved upwardly to engage ratchet wheel 39. The latter is thus rotated to cause counter wheel 37 to turn step by step in a clockwise direction. If, on the other hand, the direction of craft movement is from south to north, thus switch 18 is closed by pin 16, once for each minute travelled, to energize solenoid 26 whereupon pawl 41 is moved downwardly to engage ratchet wheel 39. The wheel 39 is rotated by the pawl 41 and causes counter wheel 37 to turn step by step in a counterclockwise direction. In the foregoing manner counter 37 follows the motion of counter 13 in an amount and in a direction determined by the amount and direction of movement of the latter counter.

Counter 37 is designed to indicate latitude from 0 to 99 degrees and minutes and to this end comprises four separate interconnected numeralled wheels 48, 49, 50 and 51, each wheel being provided with two circumferential rows of numerals 52, 53, Figure 4, thereon, for a purpose to more fully appear hereinafter, with the numerals of one row reading in a direction opposite from the numerals of the other row. Furthermore, each row is provided with two sets of numerals with numerals of one set being diametrically spaced apart from like numerals of the second set so as to provide a visual indication as well as a permanent record at the same time. Counter 37, moreover, may be of any conventional character wherein for ten steps of wheel 51, wheel 50 will be stepped once while for six steps of wheel 50, wheel 49 will be stepped once and for every ten steps of the latter wheel, wheel 48 will be stepped once.

Prior to initiating craft flight from a given position it may occur that the indication of counter 37 is not in agreement with counter 13. To the end that the former counter may be reset to correspond to the reading of the latter counter, a crown gear 54 is provided for operation with ratchet wheel 39, the gear being supported by a shaft 55 carrying at its free end a manually operable knob 56. For a resetting operation, knob 56 is urged inwardly against the action of a spring 57 to engage gear 54 with wheel 39 to rotate the latter the required amount. Once the resetting has been effected and the reading of counter 37 made to correspond with counter 13, knob 56 is released and spring 57 urges gear 54 out of engagement with wheel 39.

When a craft bearing the subject matter of the present invention is traversing a north to south direction in the Northern Hemisphere, the indication by counter 37 in degrees and minutes will decrease correspondingly with the indication of counter 13 until it becomes zero when the Equator is reached. When the craft passes over the Equator and continues into the Southern Hemisphere, operating still in a north to south direction, the indication in degrees and minutes of both counters will increase. The reverse of the above is true when the craft reverses its motion to a south to north direction.

Movement of the craft in a north to south direction will produce a clockwise rotation of wheels 48, 49, 50 and 51 of counter 37 while movement in a south to north direction will produce a counterclockwise rotation of the wheels. For a clockwise rotation of the wheels, the numerals 53 on the right hand side of the wheels are so arranged as to produce an indication in degrees and minutes that decreases until zero is reached, while the numerals 52 on the left hand side of the wheels are so arranged as to produce an indication in degrees and minutes that increases once zero is passed. With a counterclockwise rotation of wheels 48, 49, 50 and 51, the reverse is true.

In order to secure proper indication without reversing the rotation of counter wheels 48, 49, 50 and 51 for craft movement north or south of the Equator, a shutter 58 containing windows 59 is provided which is adapted for exposing to view only one row of numerals 52 or 53 of each of the wheels. To this end, shutter 58 may be provided with a slot 60 with which cooperates a pin 61 carried by a wheel 62 supported by a shaft 63 having a manually operable knob 64 thereon. Motion of the knob, for example, to the right will expose rows 53 of the numerals of the wheels and obscure rows 52 while movement of the knob to the left will obscure rows 53 and expose rows 52 to view.

If shutter 58 is set so that rows 52 of the numerals of wheels 48, 49, 50 and 51 only are visible, then for movement in a north to south direction an indication is secured which decreases to zero and for movement in a south to north direction an indication is secured which increases from zero. This setting of the shutter provides visual indication in degrees and minutes for craft movement occurring in the Northern Hemisphere. If, on the other hand, shutter 58 is set so that rows 53 of the numerals only are visible then an indication is secured which decreases for movement in a south to north direction and increases for movement in a north to south direction. The latter setting of the shutter provides visual indication in degrees and minutes for movement occurring in the Southern Hemisphere.

As is shown more clearly in Figure 6 of the drawings, the zero of the left hand row of numerals 52 of each of wheels 48, 49, 50 and 51 does not line up with the zero of the right hand row of numerals 53. This is due to the fact that the numerals of row 52 of each wheel are arranged to read in a direction opposite to those of the numerals of row 53 and also to the existence of the reset position of the counter mechanism.

The reset position of the counter 37 is between the minimum and maximum indication, i. e., all zeros and "9959." It will be obvious that rotation of the counter in either direction through the reset position will cause all the wheels of the counter to move in unison. When the indication of the counter wheels is progressively reduced until all the wheels show zero, continued rotation in the same direction will pass through the reset position causing all the wheels to move in unison to set up a maximum indication in readiness for repeating its cycle of operation. The same is true when the indication of the counter mechanism is progressively increased until it shows maximum indication, continued rotation in the same direction will cause the wheels to pass through the reset position causing all the wheels to move to set up "zero" indication and prepare the counter to repeat its cycle of operation.

If the numerals of row 52 of each wheel of counter 37 were arranged so that the zeros all line up with the zeros of the numerals of rows 53 as shown in Figure 7, then the reset position for the numerals of rows 52 would not fall between the minimum and maximum indication but would fall between the "zero" and "1" indication. This results from the fact that numerals of rows 52 are in reverse order from the numerals of rows 53. In order that the reset position may fall between the minimum and maximum indication for the numerals of rows 52, the numerals of that row must be advanced one step so that the zero of the numerals of rows 52 will be in line with all of the "9" numerals of rows 53. This places the reset position of the counter wheels between the minimum and maximum indication for both rows 52 and 53 of the numerals except that the numerals of the rows 53 are reversed from the numerals of rows 52.

Assuming the craft to be travelling in a north to south direction in the Northern Hemisphere, wheels 48, 49, 50 and 51 of counter 37 will rotate in a clockwise direction and shutter 58 will have been set so that only the numerals of rows 52 will be exposed to view. As the craft approaches the Equator, the indication becomes smaller and smaller until the Equator is reached at which time all of the zeros of numeral rows 52 of the wheels will be viewable through windows 59 of the shutter. As the craft, continuing its direction of flight, crosses the Equator into the Southern Hemisphere, shutter 58 is manually moved to the right so as to expose to view the numerals of rows 53 and obscure the numerals of rows 52. With the arrangement of the wheels as shown in Figure 6, motion of the shutter to expose the numerals of rows 53 will provide a maximum indication by the latter rows, i. e., 9959, whereas a zero (0000) indication is desired.

In order, therefore, to obtain the desired indication, actuation of knob 64 to move the shutter to the right, for example, closes a switch 65 (similar in all respects to switches 18 and 19) which energizes solenoid 25 to step wheels 48, 49, 50 and 51 through the reset position so that a zero indication will be had when the shutter is moved to the right to expose the numerals of rows 53 to view. To this end, switch 65 comprises a fixed contact 66 and a movable and normally open contact 67. Contact 66 is connected by way of a lead 68 with lead 27 associated with one side of solenoid 25 while contact 67 is connected with battery 31 by way of a bridging element 69 and leads 33, 34 and 70. Switch 65 is closed by way of an insulating pin 71 carried by wheel 62 on shaft 63. As knob 64 is moved to the right to move shutter 58 to the right pin 71 only will engage contact 67 to urge the latter into engagement with contact 66 to close switch 65 and thereby energize solenoid 25. As the craft proceeds into the Southern Hemisphere further away from the Equator, the indication provided by the numeralled wheels becomes larger and larger.

If, on the other hand, the craft is moving in a south to north direction the reverse of the above is true. As the Equator is crossed into the Northern Hemisphere, shutter 58 is moved through knob 64 to the left so as to expose to view the numerals of rows 52 and obscure the numerals of rows 53. Again, with the arrangement of the wheels as shown in Figure 6, motion of the shutter to expose the numerals of rows 52 will provide a maximum indication by the latter rows, i. e., 9959, whereas a zero (0000) indication is desired.

To obtain the desired indication, actuation of knob 64 to move the shutter to the left also closes a switch 72 comprising a fixed contact 73 and a movable contact 74 by virtue of a pin 75 carried by wheel 62 and arranged in a plane different from the plane of pin 71. Closure of switch 72 energizes solenoid 26 to step wheels 48, 49, 50 and 51 through the reset position so that the required zero indication will be obtained when the shutter is moved to the left to expose the numerals of rows 52 to view. Contact 72 is connected with one side of solenoid 26 by way of a lead 76 and with battery 31 by way of bridging element 69 and leads 70, 34 and 33.

As before mentioned, a counter 77 of the longitude indicator and recorder unit 10 is provided with numeralled wheels 78, 79, 80 and 81, in the same manner as counter 37, and is operated to follow step by step motion of longitude counter 82, located at the remote computer unit generally designated with the reference character 83, by way of solenoids 84 or 85 energized from one or the other of switches 86 and 87 which are operated by counter 82. As was described in connection with the latitude counter, the longitude counter 77 may be reset relative to counter 82 by way of a knob 88 while a shutter 89 provided with windows 90 is movable to the right or left through a knob 91. To provide proper indication when the craft passes through the zero meridian from one hemisphere to the other the wheels 78, 79, 80 and 81 are stepped in the required direction through switches 92 and 93 operable during motion of knob 91.

To secure a permanent recording of the visual indication of latitude and longitude counters 37 and 77, each row of numerals on the wheels 48, 49, 50 and 51 and 78, 79, 80 and 81, as before explained, has two sets of numbers with corresponding numbers of the sets of each row of numerals being diametrically apart. Both sets of numbers of each row of numerals may be used for either visual indication or permanent recording. For recording purposes, all the numerals are raised above the periphery of the wheels of the counters as better shown in Figure 3. It will be apparent that in reading the numeralled wheels of the counters through windows 59 and 90 of shutters 58 and 89, the numbers will be right side up while diametrically opposite to the rear of wheels the corresponding numbers will be upside down.

For recording purposes, a paper tape 95 is provided adjacent the rear of the numeralled wheels of the counters which is pressed into engagement with the rear raised numerals of the counter wheels by way of a striking bar 96 (Figure 2) pivotally mounted at 97 (Figure 3) by way of a lever 98. Bar 96 is provided with a series of spaced hammers 99, 100, 101 and 102 for counter 37 and hammers 103, 104, 105 and 106 for counter 77. Interposed between the paper tape and the striker bar is an inked ribbon 107 and mounted between the ribbon and the bar are flexible fingers 108 adjacent counter 37 and flexible fingers 109 adjacent counter 77. Each of flexible fingers 108 supports at its free end a resilient pad 110 and each of fingers 109 supports a resilient pad 111. Pads 110 and 111 are engageable by hammers 99, 100, 101 and 102 and 103, 104, 105 and 106 to urge the inked ribbon against the tape and the tape against the raised numerals of the counter wheels. As more clearly shown in Figure 5 of the drawings, flexible fingers 108 and 109 and pads 110 and 111 are of a width substantially corresponding to the width of one of the rows of numerals of each counter wheel.

In order to provide a recorded reading on tape 95, bar 96 is actuated by a solenoid 112 whose plunger 113 is adapted for engagement with the striker bar to pivot the latter about 97 toward the counter wheels. As shown in Figure 2, solenoid 112 is connected with one side of battery 31 through switch 32 by way of lead 33 and with the other side of the battery through a lead 114, a printing switch 115 comprising contacts 116 and 117, and a lead 118. Positioning ribbon 107 in the manner described provides an upside down ink impression on the reverse side of tape 95. When the tape is reversed, the ink impression reads right side up.

Inasmuch as there are two rows of numerals on each of the wheels of the counters and only one row of each wheel is visible at a time through the shutter windows, means are provided for selecting the proper row of numerals for printing, such means comprising the sets of flexible fingers 108, 109 secured by suitable means to extensions 119 and 120 of shutters 58 and 89 for movement with the latter. Each of the flexible fingers is arranged in line with each of the shutter windows so that the same row of numerals will be used for printing purposes as is used for indicating purposes. Movement of shutters 58 and 89 from right to left or vice versa will shift the fingers from one row of numerals of each wheel to the other row of numerals to provide a permanent record of craft position for either the Southern or Northern Hemispheres. A roll of paper tape and a spool of inked ribbon (not shown) may be mounted inside of the casing bearing units 10 and 11 and the tape, after a printing operation, can be drawn out through suitable opening 121, torn off and set aside as a permanent record of the desired information.

In addition to providing a remote visual indication and/or printed record of craft position, the mechanism is designed to provide a visual indication and/or printed record of the time the indication is observed or the record is made. To this end a conventional clock mechanism, generally designated with the reference character 123, may be located within computer unit 83 to drive, in a suitable manner, a counter 124 having wheels 125, 126 and 127 thereon, reading hours, minutes and seconds. Counter 124 is rotatably mounted by means of a shaft 128 which carries a wheel 129 having an insulating pin 130 thereon for closing, once for every five seconds of time, for example, a switch 131 having a fixed contact 132 and a movable contact 133. Both of the contacts connect with a relay 134 through a battery 135 by way of leads 136 and 137. Energization of the relay for each closing of switch 131, lifts an armature 138 having contacts 139 and 140 into engagement with fixed contacts 141 whereby a stepping solenoid 142, connected to contacts 139 and 140 by way of leads 143, 144, is energized from battery 31. In this manner, step by step operation of a time counter 145, in the vicinity of units 10 and 11 is effected, the counter comprising wheels 146, 147 and 148 designed to read in hours, minutes and seconds, in steps of five seconds. Counter 145 is supported for rotation by a shaft 149 which carries a ratchet wheel 150 engageable by a pawl 151, carried by a pivotally mounted lever 152, whose free end is secured to a plunger 153 of the solenoid. By virtue of the foregoing arrangement, counter 145 is caused to follow step by step the pulses from the clock. Since counter 145 is not self-setting, means are provided for manually setting the latter counter into correspondence with counter 124. For this purpose a setting knob 154 is provided having a shaft 155 supporting at its free end a crown gear 156, the knob normally being urged outwardly by a spring member 157. For a resetting operation, knob 154 is pushed inwardly against the action of the spring until gear 156 engages ratchet 150 and turned until the reading of counter 145 corresponds to that of counter 124. For printing purposes, striker bar 96 is provided with three additional hammers 158, 159 and 160 to urge tape 95 into contact with the raised numerals on the wheels 146, 147 and 148 which have corresponding numerals diametrically opposed for simultaneous visual observation from counter 145.

While a clock driven counter has been shown and described, it is to be understood that in its stead a conventional clock alone could be used having an insulated contact on one of its staffs.

Figure 1:
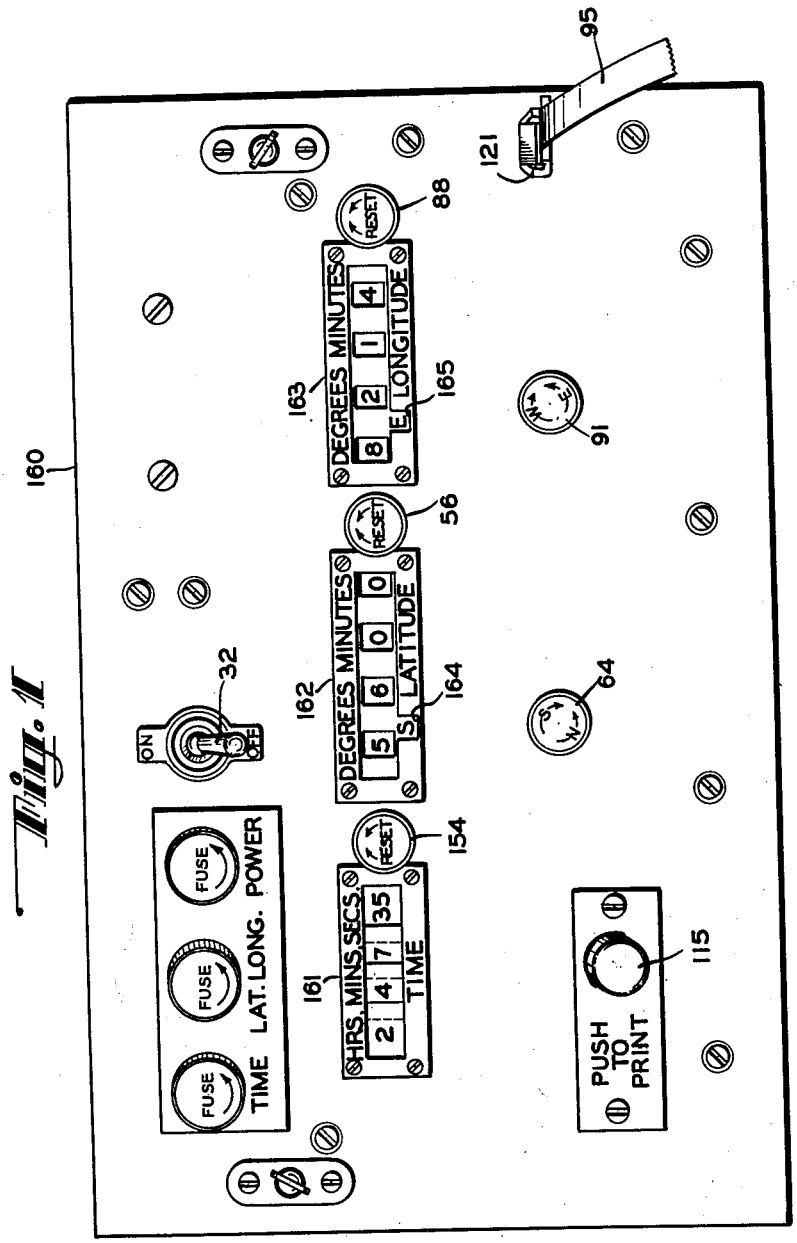
Figure 1 is a front elevation view of the novel navigational apparatus constituting the subject matter of the present invention.

As better shown in Figure 1, the remote indicating and printing mechanism of the present invention is located within a housing 160 which is provided with three window frames 161, 162 and 163, time counter 145 being arranged immediately behind frame 161, latitude counter 37 being arranged behind frame 162 and longitude counter 79 being arranged behind frame 163. Adjacent to the window frames are setting knobs 56, 88 and 154. Frames 162 and 163, moreover, are provided with slots 164 and 165 for designating the hemisphere being flown, the latter being identified by the letters N and S impressed on shutters 58 and E and W impressed on shutter 89. Also arranged on the front of casing 160 are shutter actuating knobs 64 and 91 as well as printing switch 115 and power switch 32.

Preceding a craft take-off from a landing field, knobs 56, 88 and 154 are actuated to set counters 37, 77 and 145 into correspondence with counters 13, 82 and 124 of the computer unit and thereafter switch 32 is closed. In addition shutters 58 and 89 are properly set by means of knobs 64 and 91. Thereafter, during flight the stepping solenoids will be periodically energized so that the reading of counters 37, 77 and 145 will correspond to the reading of counters 13, 82 and 124. When it is desired to permanently record the reading of counters 37, 77 and 145, switch 115 is closed whereupon solenoid 112 is energized to actuate striker bar 96 to urge tape 95 into contact with the counters. Upon opening of switch 115, tape 95 may be pulled out of casing 160 and torn off in preparation for another printing operation. It will be apparent that while a manually operated switch has been shown and described for energizing solenoid 112, the latter may be operated intermittently through a suitable clockwork.

Although but one embodiment of the invention has been illustrated and described, various changes and modifications in the form and relative arrangement of parts, which will now appear to those skilled in the art, may be made without departing from the scope of the invention. Reference is therefore to be had to the appended claims for a definition of the limits of the invention.

I claim:

1. In a navigational apparatus for mobile craft, latitude and longitude indicating and recording means comprising latitude and longitude counters having a plurality of wheels, each wheel being provided with two rows of numerals thereon, one row of numerals of each wheel being readable for craft movement in one hemisphere and the remaining row of numerals on each wheel being readable for craft movement in the other hemisphere, actuating means for advancing said wheels to indicate the position of said craft, a shutter associated with said counters and adapted to be moved transversely thereto for selectively exposing to view only the row of numerals of each wheel of said counters readable for the hemisphere being travelled, manual operable means for moving said shutter, means for recording the values indicated by said counters exposed to view by said shutter, and means actuated by said manual operable means for preselecting the same row of numerals of each wheel to cooperate with said recording means so that the numerals of the selected row exposed to view are recorded.

2. In a navigational apparatus for mobile craft, latitude and longitude indicating and recording means comprising latitude and longitude counters having a plurality of wheels, each wheel being provided with two rows of numerals thereon, one row of numerals of each wheel being readable for craft movement in one hemisphere and the remaining row of numerals on each wheel being readable for craft movement in the other hemisphere, actuating means for advancing said wheels to indicate the position of said craft, a shutter associated with said counters and adapted to be moved transversely thereto for selectively exposing to view only the row of numerals of each wheel of said counters readable for the hemisphere being travelled, means for moving said shutter when a predetermined reading on said counter is reached indicating the transition point between the hemispheres, means actuated by said shutter moving means for operating said actuating advancing means for rotating each of the counter wheels a predetermined angular distance to compensate for the change in hemispheres, means for recording the values indicated by said counters exposed to view by said shutter, and selecting means actuated by the shutter moving means for preselecting the same row of numerals of each wheel to cooperate with said recording means so that the numerals of the selected row exposed to view are recorded.

3. In a navigational apparatus for mobile craft having a position indicator for indicating craft position during travel thereof, the combination with said indicator of remotely positioned means for repeating the indications of said indicator comprising a counter having a plurality of indicating wheels, each wheel being provided with two circumferential rows of numerals thereon, one row of numerals of each wheel being readable for craft movement in one hemisphere and the remaining row of numerals of each wheel being readable for craft movement in another hemisphere, solenoid means connected to said indicator for energization thereby to provide step by step operation of said counter whereby the indication of the latter corresponds with the indication of said indicator, shutter means associated with said counter for viewing only one row of numerals of each counter wheel, manual operable means for moving said shutter to view the other row of numerals of each wheel upon said counter reaching a predetermined reading which marks the transition point between the hemispheres, and energizing means actuated by the manual operable means for energizing the solenoid means to step said counter independently of said indicator to compensate for the change in hemispheres.

4. In an indicating mechanism having a counter for indicating a function from a maximum to minimum to a maximum value without reversing the direction of rotation of the counter comprising a plurality of interconnected wheels, each wheel being provided with a pair of circumferentially arranged rows of numerals thereon arranged in reverse order from each other with the zero minimum indication of each row of each wheel being aligned with the maximum indication of the other of each wheel, the combination with said counter of a shutter mechanism arranged for transverse movement relative thereto for exposing to view one row of numerals of each of said wheels and for obstructing from view the other row of numerals of each of said wheels, manually operable means for moving said shutter mechanism to expose to view the other row of numerals when said counter reads a predetermined value, and means actuated by the manual operable means for rotating said wheels one additional numeral beyond the predetermined reading on said counter.

JAMES I. MITCHELL.

REFERENCES CITED

The following references are of record in the file of this patent:

UNITED STATES PATENTS

| Number | Name | Date |
|---|---|---|
| 1,038,890 | Hopkins | Sept. 17, 1912 |
| 1,370,426 | Giles | Mar. 1, 1921 |
| 1,492,319 | Copeland | Apr. 29, 1924 |
| 1,805,665 | Hough | May 19, 1931 |
| 1,939,822 | Martin | Dec. 19, 1933 |
| 1,982,882 | Rhodes | Dec. 4, 1934 |
| 2,022,275 | Davis | Nov. 26, 1935 |
| 2,414,821 | Levey et al. | Jan. 28, 1947 |

FOREIGN PATENTS

| Number | Country | Date |
|---|---|---|
| 558,644 | Great Britain | Jan. 13, 1944 |